Nov. 13, 1962   J. L. GALEZNIAK   3,063,697
PIPE CUTTING APPARATUS
Filed Dec. 2, 1959   4 Sheets-Sheet 1
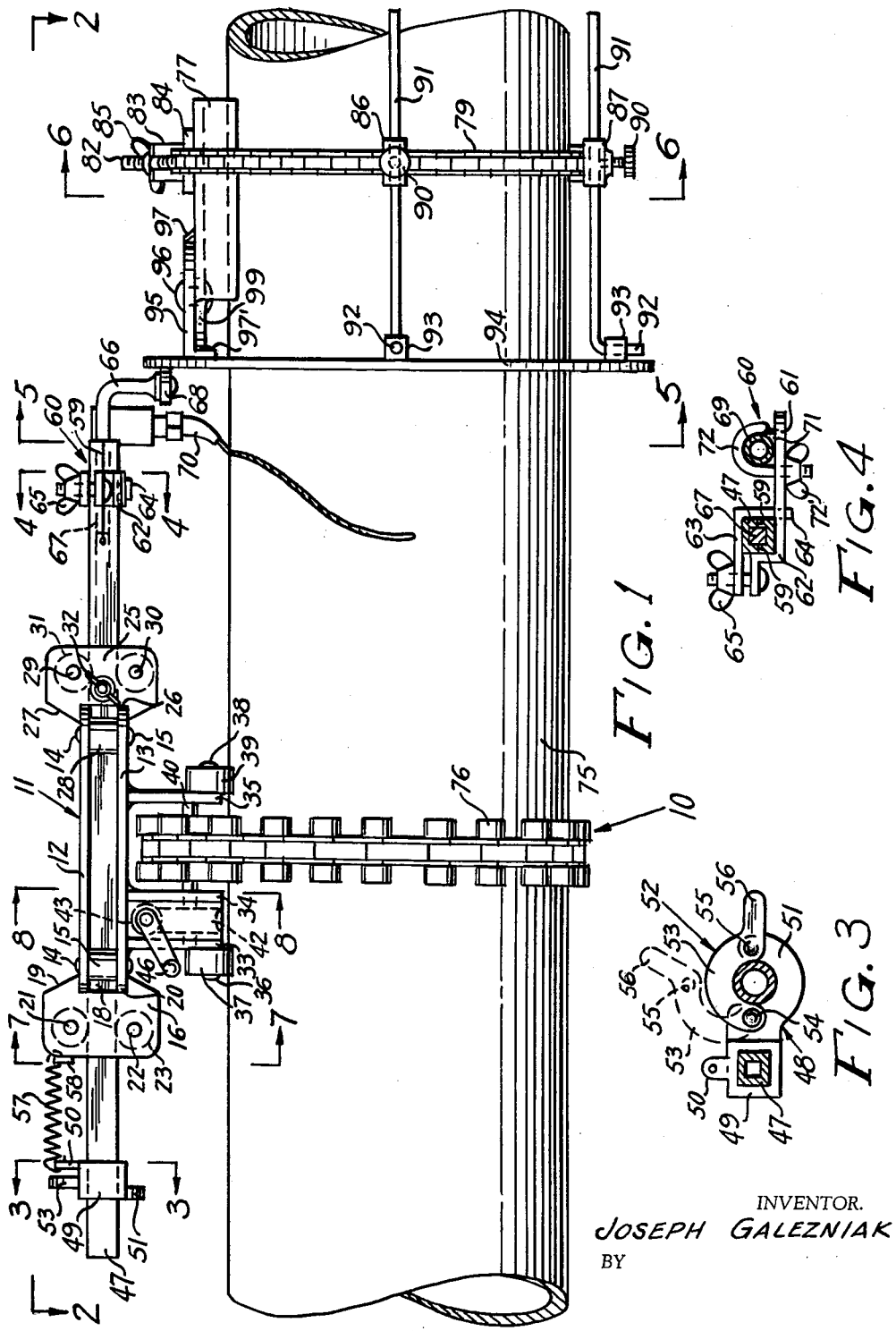
INVENTOR.
JOSEPH GALEZNIAK
BY

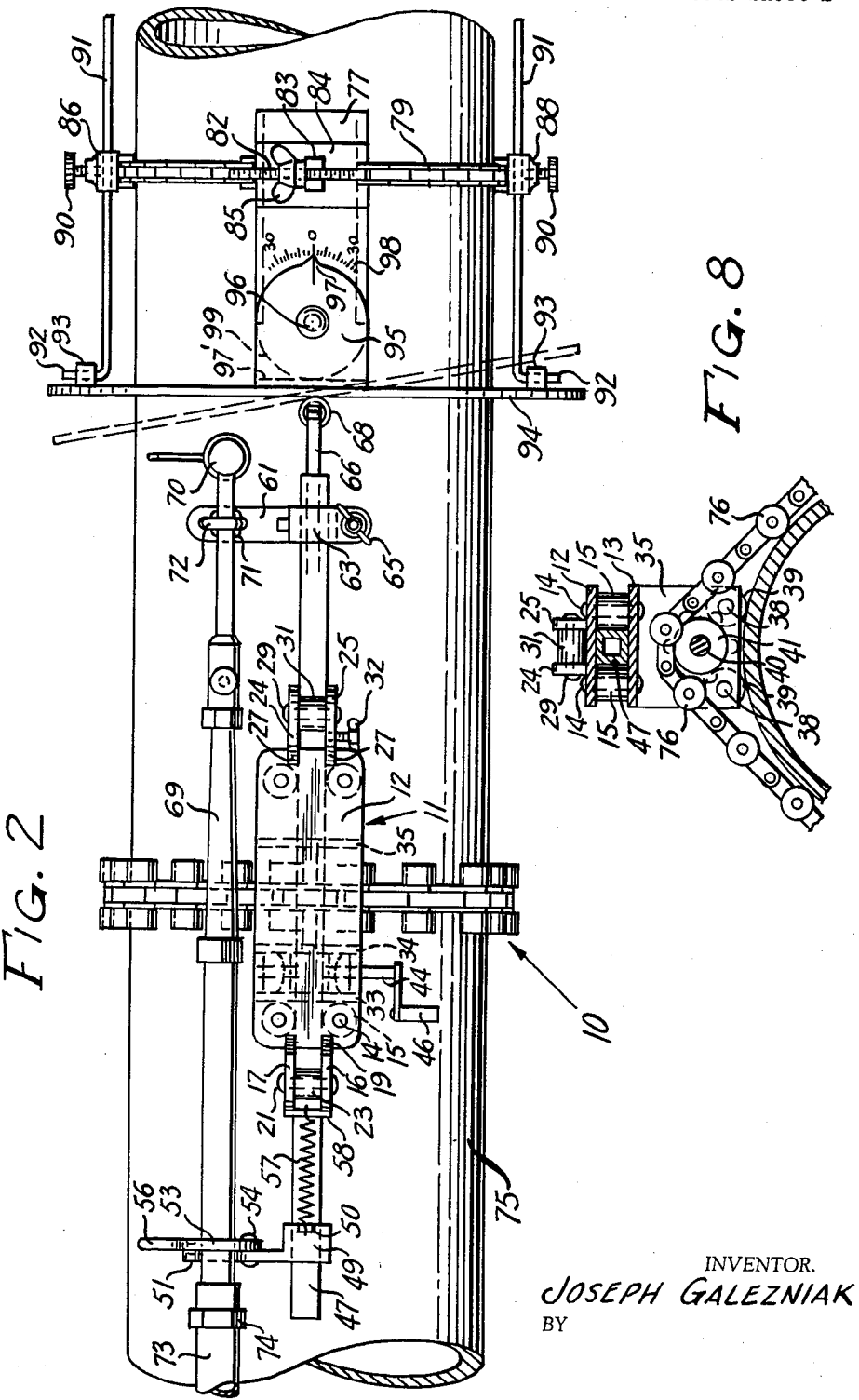

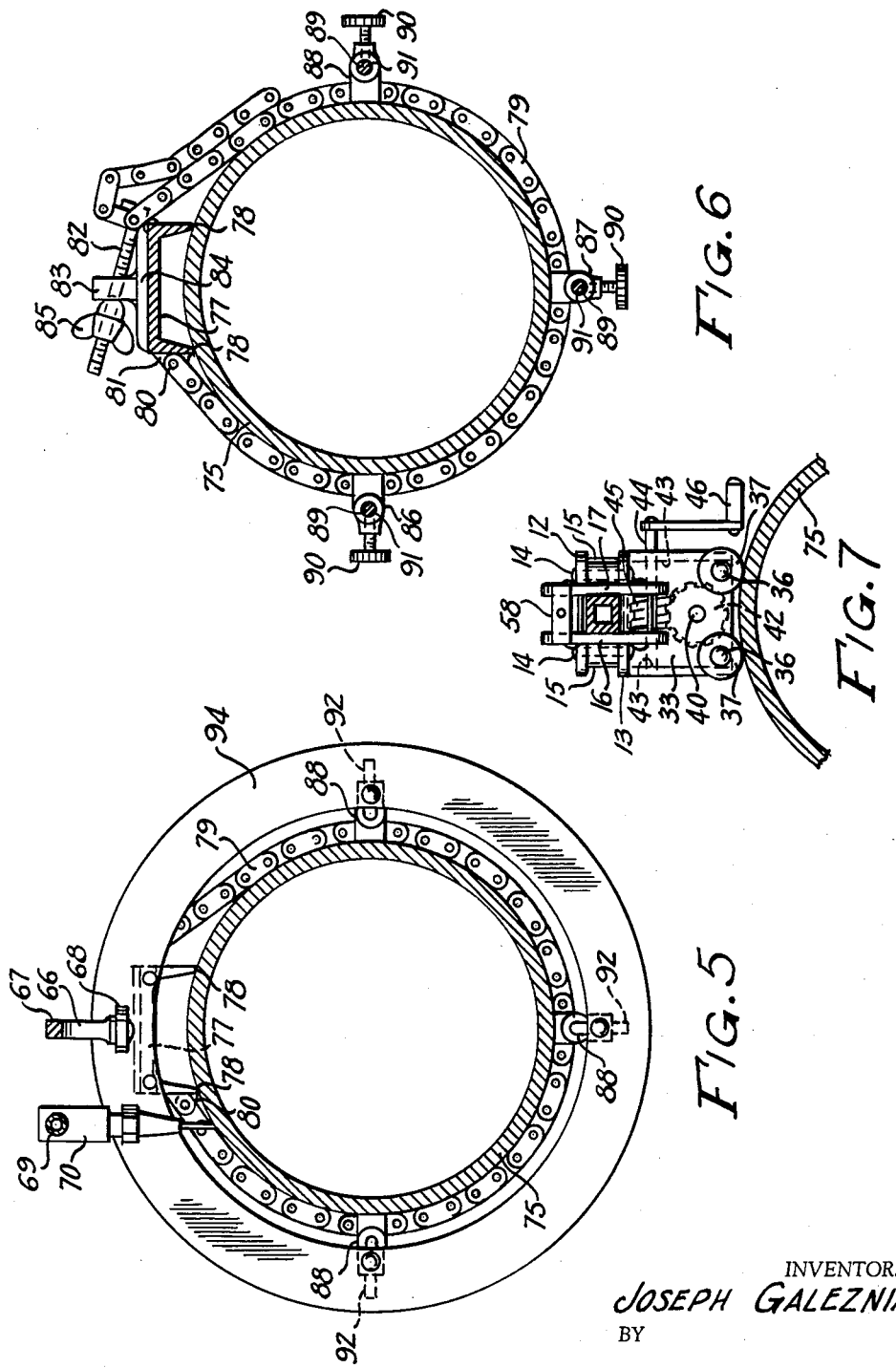

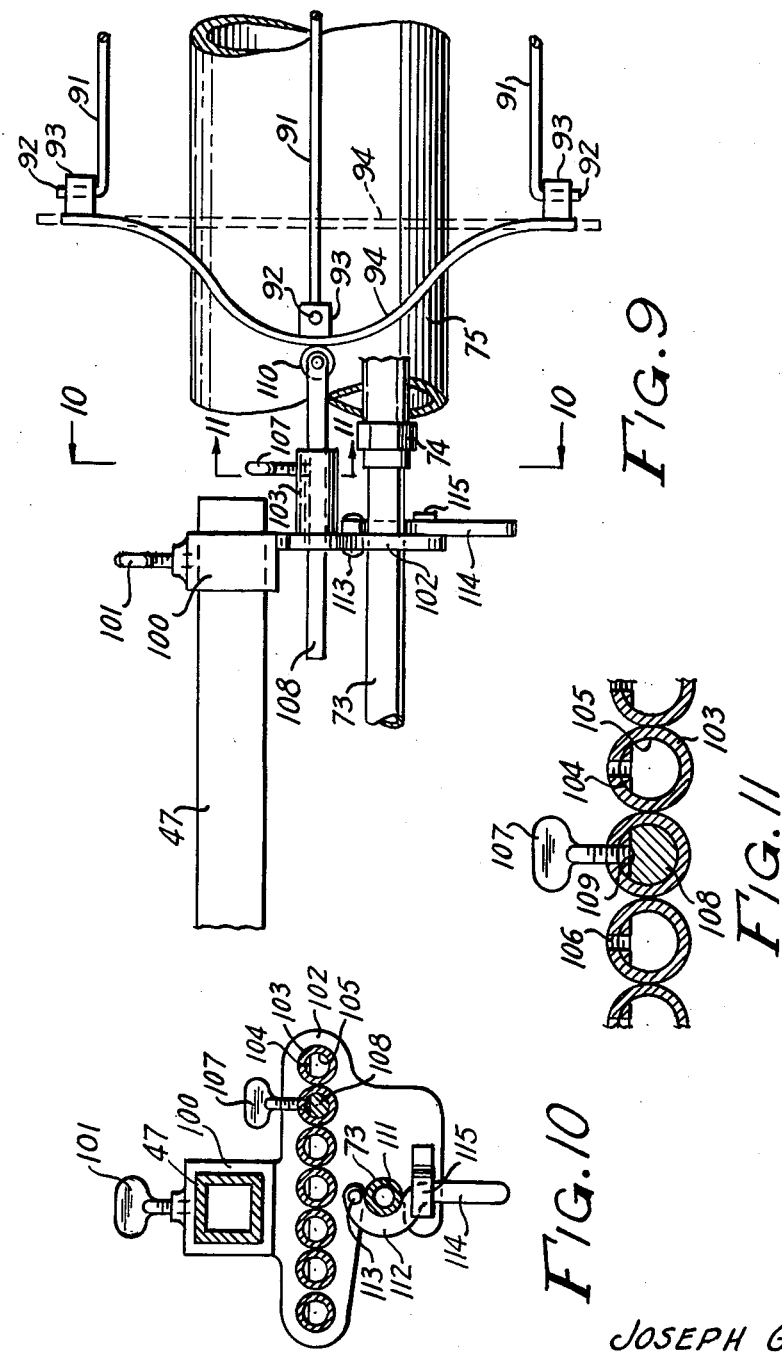

United States Patent Office 3,063,697
Patented Nov. 13, 1962

3,063,697
PIPE CUTTING APPARATUS
Joseph L. Galezniak, West Collingswood, N.J.
Filed Dec. 2, 1959, Ser. No. 856,702
1 Claim. (Cl. 266—23)

This invention relates to improvements in pipe cutting apparatus and more particularly to an apparatus that will, by means of an oxyacetylene torch, make straight, biased or angular cuts in pipe or other cylindrical articles.

An object of the invention is to provide a device of this character that provides cutting means that will make cuts along predetermined lines.

Another object of the invention is to provide a device of this character that includes means for controlling the cutting instrumentality which in this instance is an oxyacetylene torch.

A further object of the invention is to provide a device of this character that is simple in construction, efficient in operation and economical to manufacture.

With the above and other objects and advantages in view, the invention consists of the novel details of construction, arrangement and combination of parts more fully hereinafter described, claimed and illustrated in the accompanying drawings, in which:

FIG. 1 is a longitudinal side elevational view of a pipe cutting apparatus embodying the invention in position on a piece of pipe to be cut;

FIG. 2 is a longitudinal top plan view on the line 2—2 of FIG. 1;

FIG. 3 is a vertical sectional view on the line 3—3 of FIG. 1;

FIG. 4 is a vertical sectional view on the line 4—4 of FIG. 1;

FIG. 5 is a vertical sectional view on the line 5—5 of FIG. 1;

FIG. 6 is a vertical sectional view on the line 6—6 of FIG. 1;

FIG. 7 is a vertical sectional view on the line 7—7 of FIG. 1;

FIG. 8 is a vertical sectional view on the line 8—8 of FIG. 1;

FIG. 9 is a fragmentary elevational view of a modified form of guide ring and cutting assembly;

FIG. 10 is a vertical sectional view on the line 10—10 of FIG. 9; and

FIG. 11 is a vertical sectional view on the line 11—11 of FIG. 9.

Referring more in detail to the drawings, wherein like parts are designated by like reference numerals, the reference numeral 10 is used to designate a pipe cutting apparatus embodying the invention.

The pipe cutting apparatus 10 comprises a carriage 11 which is composed of an upper horizontally disposed rectangular shaped plate 12 and a lower horizontally disposed rectangular shaped plate 13 of similar size, and both plates are provided with rounded corners.

A short vertically disposed shaft 14 extends through each corner of the plates 12 and 13 and a roller bearing 15 mounted on each of the shafts 14 retains the plates 12 and 13 in parallel spaced relation to each other. Mounted at one end of the plates 12 and 13 there is a pair of spaced parallel vertically disposed plates 16 and 17. The plates 16 and 17 are of substantially rectangular shape with each of the edges thereof, which are secured to the plates 12 and 13, provided with a centrally located cutout 18 to receive the plates 12 and 13. The remainder of the edges, as at 19 and 20, extend rearwardly in angular relation to the plane of the plates 12 and 13. A pair of short horizontally disposed shafts 21 and 22 are mounted in the plates 16 and 17, and a roller bearing 23 is mounted on each of the shafts 21 and 22 to retain the plates 16 and 17 in spaced parallel relation to each other. A pair of plates 24 and 25, similar in shape and size to the plates 16 and 17, is mounted at the opposite ends of the plates 12 and 13. A cutout 26 is provided in the edges of the plates 24 and 25 secured to the plates 12 and 13 and the remainder of the edges are angularly disposed as indicated at 27 and 28. As in the plates 16 and 17 a pair of short horizontally disposed shafts 29 and 30 are mounted in the plates 24 and 25 and a roller bearing 31 is mounted on each of the shafts 29 and 30 to retain the plates 24 and 25 in spaced parallel relation to each other. A thumb screw 32 is mounted in the plate 25 centrally thereof between the roller bearings, but spaced laterally thereof.

A pair of spaced parallel vertically disposed plates 33 and 34 is secured to the undersurface of the lower plate 13 transversely thereof and adjacent the edges of the plates 12 and 13 to which the plates 16 and 17 are secured, and a single vertically disposed plate 35 is also secured to the undersurface of the lower plate 13 in spaced relation to the plate 34 adjacent the edges of the plates 12 and 13 to which the plates 24 and 25 are secured. A short shaft 36 is mounted in each lower corner of the plate 33 and a roller bearing 37 is mounted on each of the shafts 36. There are also short shafts 38 mounted in each lower corner of the plate 35 and a roller bearing 39 is mounted on each of the shafts 38.

A shaft 40 is journalled in the plates 33, 34 and 35 centrally thereof intermediate of the rollers 37 and 39 and a sprocket 41 is fixed to shaft 40 intermediate of the plates 34 and 35. A spur gear 42 is fixed to the shaft 40 intermediate of the plates 33 and 34 and a plate 43 secured at each of the outer edges of the plates 33 and 34 has a shaft 44 journalled thereon on which is fixed a worm gear 45 that meshes with the gear 42. A hand crank 46 fixed to the outer end of the shaft 44 will rotate the shaft 44 to operate the gear assembly 45, 42 to rotate shaft 40 and the sprocket 41 thereon for a purpose to be later described.

A hollow square shaped horizontally disposed bar 47 is slidably mounted in the carriage 11 longitudinally thereof intermediate of the rollers 23, 15 and 31.

A rear mounting bracket 48 is provided with a square shaped mounting socket 49 that is fixed to the rear end of the bar 47 and a vertically disposed apertured ear 50 is formed integral with or secured to the socket 49 centrally of the upper surface thereof. Extending laterally of the socket 49 is the lower half 51 of a circular clamp 52 and the upper half 53 of the clamp 52 is pivoted to the lower half 51 at 54. Detents 55 on the halves 51 and 53 retain the halves 51 and 53 in fixed relation to each other. A finger grip 56 on the upper half 53 permit separation of the halves 51 and 53 as desired.

A tension spring 57 extends between the ear 50 and a plate 58 secured to the rear edges of the plates 16 and 17 adjacent the upper edges thereof, and the spring 51 urges the carriage 11 away from the bracket 48 for a purpose to be later described.

The forward edge of the bar 47 is diametrically split as at 59 and a front mounting bracket 60 is mounted on the front of the bar 47 in circumjacent relation thereto. The bracket 60 includes a lower arm 61 having an L-shaped portion 62 that engages the lower surface of the bar 47 and an upper L-shaped arm 63 that engages the upper surface of the bar 47 in diametric relation to the L-shaped portion 62 of the arm 61. The arm 63 is pivotally connected at 64 to the arm 61 and a bolt and wing nut assembly 65 mounted in the outer ends of the L-shaped portion 62 and the arm 63 will, when tightened securely, retain the bracket 60 in fixed relation to the bar 47 and also compresses the front end of the bar 47 by reason of the split end thereof.

An L-shaped arm 66 has a square shaped portion 67 at one end thereof which is inserted into the bar 47 and retained therein by the clamp 60. A horizontally disposed roller 68 is rotatably mounted on the opposite end of the arm 66 for a purpose to be later described.

An oxyacetylene torch 69, having the cutting nozzle 70 on one end, is mounted at the rear end in the clamp 48 and rests on the arm 61 at the front end. The arm 61 has a rest 71 which engages the torch 69 and a hook bolt 72 engages the torch 69 and retains it in the rest 71 by reason of the wing nut 72'. The torch 69 has a supply pipe 73 connected thereto from a convenient source of supply.

The carriage 11 is mounted on a pipe 75 by reason of the roller bearings 33 and 39 and a roller chain 76 positioned on the pipe 75 in circumjacent relation thereto engages the sprocket 41 so that as the sprocket 41 is rotated, as previously described, the sprocket 41 will cause the carriage 11 to roll around the pipe 75 so that the torch 70 will cut the pipe 75 as the carriage 11 rolls around the pipe 75.

A channel shaped mounting plate 77, having parallel shaped edges 78, is mounted on the pipe 75 so that edges 78 engage the pipe 75. One end of a link chain 79 is pivotally connected at 80 to an apertured ear 81 on the plate 77 and the chain 79 is then wrapped around the pipe 75 so that a screw chain tightener 82 connected to the chain 79 will engage the bifurcated ear 83 on a transversely extending mounting plate 84 that is secured to the upper surface of the plate 77. A wing nut 85 on the screw 82, when rotated, will tighten the chain 79 in the usual manner.

Mounting brackets 86, 87 and 88 are mounted at three radial positions on the chain 79 and each bracket has a bore 89 which is open to permit an end of a set screw 90 mounted in each of the brackets 86, 87 and 88 to enter the bore 89. The set screw 90 will thus engage a rod 91 that is slidably mounted in each of the bores 89 of the brackets 86, 87 and 88. Each of the rods 91 has a right angularly disposed end portion 92 and each end portion 92 of the rods 91 is slidably mounted in an apertured block 93 and the blocks 93 correspond in number with the brackets mounted on the roller chain 79 so that there are three radially disposed blocks 93.

The blocks 93 are secured to the rear surface of a ring shaped guide 94 so that the blocks 93 and rods 91 are radially alined with each other. The ring 94 is placed on the pipe 75 in circumjacent relation thereto so that the ring 94 may be engaged by the roller 68.

A plate 95 is pivotally mounted at 96 on the plate 77 and one end of the plate 95 has a right angularly disposed flange 97 secured to the rear surface of the ring 94 at the remaining radial point not occupied by the blocks 93. The opposite end of the plate 95 is oppositely curved to form a pointer 97 and the pointer 97 coacts with an arcuate measuring guide 98 which extends zero degrees to 30 degrees both right and left of the zero degree mark.

The end of the plate 77 underlying the plate 95 has a rounded end 99 that gives full support to the plate 95 and to have the rounded end 99 coincide with the curvature of that portion of the plate 95 that coincides with the rounded end 99 of the plate 77 as the plate 95 is pivoted on the pivot 96.

In the operation of the pipe cutting machine, the machine 10 is mounted on the pipe 75 so that the cutting torch 70 will coincide with the line on the pipe 75 to be cut.

The ring 94 can be pivoted on the pivot 96 to provide a guide making a cut from zero mark to 30 degrees right or left of the zero mark. The set screws 90 will be tightened to engage the rods 91 and thus the ring 94 will be retained at the setting determined by the pointer 97 and the measuring guide 98. Therefore, as the hand crank 46 is rotated and the carriage 11 rolls around the pipe 75, the roller 68 follows the rings 94 to guide the cutting torch 70 and cut the desired line.

If the cut is on a straight line, the thumb screw 32 is rotated to engage the bar 47 to retain it in fixed relation to the carriage 11, otherwise the expansion spring 57 urges the roller 68 into engagement with the ring 94. Thus, as the carriage 11 travels around the pipe 75, the roller 68 and bar 47 will reciprocate as found necessary by the position of the ring 94.

The machine 10 and guide ring assembly can be easily mounted on or removed from a pipe and the machine 10 may be set to make any desired cut.

In FIGS. 9 to 11 inclusive a guide ring assembly is shown that is adapted to make saddle cuts on all sizes of pipe Except for the assembly to be later described, the structure of the pipe cutting apparatus 10 is as previously described.

Mounted for sliding adjustment on the horizontally disposed bar 47 is a square shaped mounting socket 100 in which is mounted to set screw 101 whereby the socket 100 may be secured in fixed relation to the bar 47. A mounting plate 102 is formed integral with the socket 100. A row of horizontally disposed spaced mounting sockets 103 are mounted on the plate 102 and the sockets 103 are positioned in places parallel to the bar 47. Each of the sockets 103 having a flat portion 104 in the bore 105 thereof and a threaded bore 106 is positioned in the center of the portion 104. A set screw 107 is engaged with the bore 106. A rod 108 having a flat side 109 is selectively mounted in the socket 103 and the side 109 is in engagement with the flat portion 104, as shown in FIG. 11. A roller 110 is rotatably mounted in the forward end of the rod 108 and the roller 110 engages the plate 94 as previously described with reference to the roller 68. The supply pipe 73 extends through an opening 111 in the plate 102 and a semi-circular clamp 112 that is pivoted at 113 on the plate 102, is adapted to engage the supply pipe 73 and a handle 114 on the clamp 112 is grasped by an operator so that the clamp 112 may be moved into engagement with the pipe. A spring latch 115 that is rigidly secured to the plate 102 engages the handle 114 of the clamp 112 to retain the plate 102 in fixed relation to the supply pipe 73 and vice versa.

In this form of the invention the rod 108 is selectively received in the sockets 103 so that the angle of the engagement of the cutting torch 70 with the pipe 75 is changed as the axis of approach of the rod 108 is altered by the position of the rod 108 in the mounting sockets 103.

As previously stated, except for the elements previously described, the pipe cutting apparatus 10 remains the same and thus the cutting of the pipe by the pipe cutting assembly 10 is regulated by the roller 110.

It is believed that the structure and operation of the invention will be apparent to those skilled in the art and it is to be understood that changes in the minor details of construction, arrangement and combination of parts may be resorted to provided they fall within the spirit of the invention and the scope of the appended claims.

Having thus described the invention what is claimed as new and desired to be secured by Letters Patent is:

In a pipe cutting machine, a carriage comprised in part by parallel end plates and an intermediate plate adapted to be positioned at right angles to the axis of the pipe to be cut, a second pair of parallel plates adapted to be positioned parallel to the axis of this pipe to be cut with one plate of the latter pair secured to the tops of the parallel end and intermediate plates, third and fourth pairs of parallel plates respectively secured to the ends of the second pair of parallel plates at right angles to the latter and adapted to be positioned parallel to the axis of the pipe to be cut, rollers mounted on the bottoms of the first parallel end plates and adjacent the sides of the latter, a shaft journalled in the parallel end plates and the intermediate plate, a sprocket mounted between one end plate and the intermediate plate, a chain trained over the sprocket and adapted to encircle the pipe, a driven gear on said shaft between the other end plate and the intermediate plate, a second shaft journalled between the latter end plate and the intermediate plate, a driving gear on the second shaft meshing with the driven gear, a hand crank on the second shaft, pairs of parallel guide rollers positioned between the plates of the second pair of plates adjacent the ends of the latter, pairs of parallel guide rollers positioned between the plates of the third and fourth pair of plates, a bar slidably mounted between the guide rollers of each pair of plates, a socket mounted on the outer end of the bar, a tension spring secured at its opposite ends respectively to the socket and one of said latter pairs of parallel plates for biasing said bar with its inner end away from said first parallel plates, an arm on said bar, a cutting torch carried by said arm, and a follower roller carried by said bar adapted to engage a guide means.

References Cited in the file of this patent

UNITED STATES PATENTS

| | | |
|---|---|---|
| 1,852,412 | Hickey | Apr. 5, 1932 |
| 2,222,127 | Turner | Nov. 19, 1940 |
| 2,389,286 | Watkins | Nov. 20, 1945 |
| 2,408,517 | Howard | Oct. 1, 1946 |
| 2,502,660 | McLean | Apr. 4, 1950 |
| 2,990,169 | Wheeler | June 27, 1961 |

FOREIGN PATENTS

| | | |
|---|---|---|
| 923,132 | France | June 27, 1947 |
| 1,081,295 | France | Dec. 17, 1954 |